Patented Feb. 13, 1951

2,541,967

UNITED STATES PATENT OFFICE 2,541,967

N-SUBSTITUTED 2-AMINO-INDANES

Harold G. Kolloff, Kalamazoo, Mich., and Nathan Levin, Bloomfield, N. J., assignors to Upjohn Company, a corporation of Michigan No Drawing. Application September 5, 1944, Serial No. 552,822

6 Claims. (Cl. 260—570.5)

This invention relates to a new class of amines having the formula:

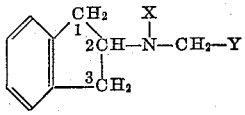

wherein X represents hydrogen or a methyl radical and Y represents hydrogen, a hydrocarbon radical, or a substituted hydrocarbon radical, and to salts thereof.

Members of the new class of compounds herein disclosed have been prepared and certain of their physical properties have been determined whereby they may be identified readily. These new compounds are particularly useful as bronchodilators having little or no effect on the blood pressure.

Compounds having the above formula wherein X represents hydrogen and Y represents a hydrocarbon or substituted hydrocarbon radical may be prepared by condensing 2-aminoindane with an aldehyde and reducing catalytically the resulting azomethine or Schiff's base, to form the secondary amine. By methylating the secondary amine with formaldehyde according to the method of Eschweicher (Ber., 38, 880 (1905)), a methyl group may be introduced into the X position and by methylating the azomethine intermediate, using a modification of the method of Decker and Becker (Ann., 395, 328 (1913)) a quaternary ammonium salt is formed which may be hydrolyzed to form 2-methyl-amino-indane.

2-Amino-indane, the starting material for the preparation of these new compounds according to the herein described methods, has been prepared and described by Kenner and Mathews (J. Chem. Soc. 105, 745 (1914)), by Huckel, Yanschulewitsch, Sacks and Nerdel (Ann. 518, 155 (1935)), by Borsch and Pommer (Ber., 54, 102 (1921)), and by Benedickt (Ann. 275, 351 (1893)). For the present purpose 2-amino-indane was prepared from 2-bromo-1-indanol obtained in turn from indene by the method of Suter and Milne (J. Amer. Chem. Soc., 62, 3473 (1940)), by reacting 2-bromo-1-indanol with sodium methylate according to the method of Heusler and Schieffer (Ber., 32, 28 (1899)), to form 2-methoxy-1-indanol which was then hydrolyzed to 2-indanone. 2-Indanone was converted to the oxime and the oxime reduced catalytically using an active palladium catalyst.

The free amines of the invention are oily liquids or low-melting solids which darken when exposed to the air. They dissolve in dilute aqueous mineral acids, such as hydrochloric, hydrobromic and sulfuric acids, and form salts which may be recovered in well-defined crystalline form. The amines are only slightly soluble in water but soluble in most organic solvents. The hydrochloric acid salts may be recrystallized from dilute ethanol or from a mixture of ethanol and ether. The amines are conveniently recovered, stored, and used in the form of their salts, e. g. their hydrochlorides.

In preparing the new compounds, azomethines were first prepared by reacting 2-amino-indane with an appropriate aldehyde according to known methods of preparing this class of compounds. Since 2-amino-indane was ordinarially isolated and stored in the form of its hydrochloride, the preparation of the azomethines was usually carried out by heating approximately equi-molecular proportions of the hydrochloride, the aldehyde, and of sodium bicarbonate together in alcoholic solution. The azomethine crystallized from the solution upon cooling and diluting with water. Recrystallization was effected, when desired, from dilute alcohol.

Catalytic reduction of the azomethines was accomplished readily by treating the compound in glacial acetic acid or in alcoholic solution with hydrogen e. g. in a Parr catalytic hydrogenator (Organic Syntheses, Coll. vol. 1, (1941), p. 61) using Adams platinum oxide catalyst. Reduction was usually complete in from 1 to 4 hours under a hydrogen pressure of from about 1 to 5 atmospheres, or higher, and a temperature of from about 10° to about 40° centigrade. Other temperatures and pressures may, of course, be employed. After the absorption of hydrogen had ceased, the solution was filtered to remove the catalyst, the filtrate acidified and concentrated under slightly reduced pressure and finally dried under vacuum. Recrystallization of the residue was usually effected from a mixture of ether and anhydrous alcohol, the secondary amine being recovered in the form of its hydrochloric acid salt.

Methylation of secondary amines, prepared as indicated above, was accomplished by prolonged heating of the hydrochloride of the amine with sodium bicarbonate and formaldehyde in aqueous solution, usually with the addition of formic acid. The use of a moderate excess of formaldehyde is preferable. The solution was then acidified with a mineral acid and evaporated to dryness to remove the formic acid and excess formaldehyde. Upon dissolving the residue in a minimum amount of hot water and filtering, colorless crystals of the tertiary amine were precipitated from the filtrate by adding sodium hydroxide. Recrystallization of the tertiary amines was effected from hot dilute alcohol when desired.

The azomethines formed by condensing 2-amino-indane with an aldehyde, such as piperonal, were methylated using a modification of the Decker and Becker method employing dimethyl sulfate instead of an alkyl halide and the quaternary ammonium salt thus formed then hydrolyzed. The methylation of the azomethines was carried out by dissolving the azomethine and freshly distilled methyl sulfate in an anhydrous organic solvent inert under the conditions of the reaction, for example, ethylbenzene or xylene, and heating the solution for several hours at about 100° centigrade. The solution was then cooled and diluted with aqueous methanol or other low-boiling alcohol and the mixture refluxed to destroy the last traces of methyl sulfate. The refluxed mixture was acidified and the methanol and inert solvent were vaporized and the aqueous solution remaining was cooled, extracted with ether, and made strongly alkaline with concentrated aqueous ammonia. 2-Methyl-amino-indane was isolated in the form of its hydrochloride by extracting the ethereal solution with dilute hydrochloric acid. The acid extract was evaporated to dryness and the residue recrystallized from a mixture of ether and anhydrous ethanol.

Other methods for preparing the compounds of the invention may be employed, if desired, and the invention is not limited as to such method.

The following examples are given by way of illustration but are not to be construed as limiting:

*Preparation 1.—2-Bromo-1-indanol*

2-Bromo-1-indanol was prepared in 85 per cent yield from indene by the method of Suter and Milne.

*Preparation 2.—2-Methoxy-1-indanol*

This intermediate compound was prepared by adding 127.8 grams (0.6 mole) of 2-bromo-1-indanol to a solution of 30 grams (1.3 moles) of sodium in 300 milliliters of anhydrous methanol and refluxing the mixture for 1 hour. Approximately one half of the methanol was then evaporated and the remaining mixture diluted with about 1 liter of water. Upon cooling, the dark oil which separated was extracted with ether. The extract was dried over anhydrous potassium carbonate, the solvent evaporated and the product distilled. A yield of 79.4 grams, or 82.4 per cent of the theoretical amount, of 2-methoxy-1-indanol was obtained by distilling at 149–152° centigrade at a pressure 11–12 millimeters of mercury.

*Preparation 3.—2-Indanone*

Hydrolysis of 2-methoxy-1-indanol was carried out by refluxing for 1 hour a mixture of 49.2 grams (0.3 mole) of the methoxy alcohol with a solution of 66 milliliters of concentrated sulfuric acid in 300 milliliters of water. The mixture was then distilled with steam. Upon cooling the distillate, colorless crystals of 2-indanone separated and were recovered by filtering and drying. A yield of 29.5 grams or 74.5 per cent of the theoretical amount, of 2-indanone melting at 56–57° centigrade was thus obtained. 2-Indanone polymerizes to a resin upon standing, even at low temperatures. Its immediate conversion to the oxime is, therefore, desirable.

*Preparation 4.—2-Indanone-oxime*

A solution of 29.7 grams (0.225 mole) of 2-indanone in 150 milliliters of pyridine was mixed with cooling and agitation, with a solution of 18.8 grams (0.270 mole) of hydroxylamine hydrochloride in 60 milliliters of dilute ethanol. After standing at room temperature for 48 hours the mixture was added, with stirring, to 500 milliliters of ice water and the precipitated oxime filtered with suction and washed well with cold water. After recrystallizing from 50 per cent ethanol there was obtained 31.5 grams, or 95.2 per cent of the theoretical amount, of 2-indanone oxime in the form of colorless crystals decomposing at 152–153° centigrade.

*Preparation 5.—2-Amino-indane hydrochloride*

An active palladium catalyst was prepared by shaking one part of palladium chloride with 9 parts of activated carbon (Norit) in a 1.0 normal aqueous sodium acetate solution. The mixture was filtered, the catalyst washed with alcohol on the filter, and kept moist with alcohol during storage and handling to prevent its catching fire. To a suspension of 4.4 grams (0.03 mole) of 2-indanone oxime in 100 milliliters of anhydrous ethanol containing 3.3 grams (0.09 mole) of hydrogen chloride there was added 3 grams of active palladium catalyst and 0.3 gram of crystalline palladium chloride. The mixture was shaken in an atmosphere of hydrogen at atmospheric pressure and ordinary room temperature for about 8 hours, at the end of which time the absorption of hydrogen had ceased. The reaction mixture was warmed on the steam bath to dissolve the amine hydrochloride and the catalyst separated by filtering. The filtrate was concentrated in a current of dry air and finally dried under vacuum. The crystals of 2-amino-indane hydrochloride, after recrystallization from a mixture of anhydrous ethanol and ether, darkened at 220° centigrade. A yield of 4.9 grams, or 96.3 per cent of the theoretical amount, of the hydrochloride was thus obtained.

*Preparation 6.—2-Benzalamino-indane*

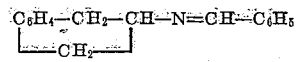

A mixture of 8.5 grams (0.05 mole) of 2-amino-indane hydrochloride, 5 milliliters (0.05 mole) of benzaldehyde, 4.6 grams (0.055 mole) of sodium bicarbonate, and 75 milliliters of alcohol was refluxed for 2 hours. The mixture was then cooled to room temperature, diluted with 200 milliliters of water, and the crystals of 2-benzalamino-indane which separated were recovered by filtering and dried with suction. Recrystallization of the product from dilute alcohol with the addition of a small amount of decolorizing charcoal gave 10.6 grams, or 95.5 per cent of the theoretical amount, of 2-benzalamino-indane in the form of colorless crystals melting at 58–67° centigrade. The product appeared to be a dimorphic mixture. A sample of the product was recrystallized repeatedly from petroleum ether without significant change in the melting point. Analysis of the recrystallized product gave the following values:

N, per cent
Calc. for $C_{16}H_{15}N$ _____ 6.34
Found _____ 6.20

Preparation 7.—2-Piperonylidineamino-indane

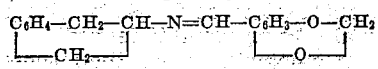

This compound was prepared by the method of the preceding example from a mixture of 5.1 grams (0.03 mole) of 2-amino-indane hydrochloride, 4.8 grams (0.032 mole) of piperonal, and 2.6 grams (0.031 mole) of sodium bicarbonate in 150 milliliters of ethanol. The product upon recrystallization from 60 per cent methanol was obtained in the form of small colorless needles melting at 93.5–95.5° centigrade. The yield was 6.3 grams, or 79.2 per cent of the theoretical amount. Analysis of the recrystallized product gave the following values:

|  | N |
|---|---|
| Calc. for $C_{17}H_{15}NO_2$ | 5.28 |
| Found | 5.07 |

Preparation 8.—2-Anisalamino-indane

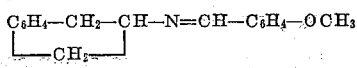

In a similar manner 2-anisalamino-indane was prepared from a mixture of 5.1 grams (0.03 mole) of 2-amino-indane hydrochloride, 3.6 grams (0.03 mole) of anisaldehyde, and 3.4 grams (0.04 mole) of sodium bicarbonate in 50 milliliters of ethanol. The product after recrystallization from dilute methanol melted at 100–101° centigrade. The yield was 6.9 grams, or 90.8 per cent of the theoretical amount. Analysis of the product gave the following values:

|  | N |
|---|---|
| Calc. for $C_{17}H_{17}NO$ | 5.56 |
| Found | 5.70 |

Example 1.—2-Benzylamino-indane hydrochloride

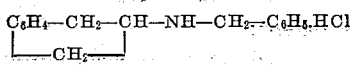

A solution of 4.4 grams (0.02 mole) of 2-benzalamino-indane (Preparation 6) in 25 milliliters of anhydrous ethanol containing about 0.04 gram of platinum oxide catalyst was shaken in an atmosphere of hydrogen at a temperature of about 28° centigrade and a pressure of slightly more than one atmosphere for about 3 hours. The hydrogenated mixture was filtered to remove the catalyst, acidified with dilute hydrochloric acid, and evaporated to dryness. The residue was recrystallized from dilute ethanol. The product obtained weighed 4.6 grams, which was a yield of 90 per cent of the theoretical amount. The product began to darken at about 205° centigrade. Analysis of the product gave the following values:

|  | N | Cl |
|---|---|---|
| Calc. for $C_{16}H_{18}ClN$ | 5.40 | 13.66 |
| Found | 5.66 | 13.72 |

Example 2.—2-Piperonylamino-indane hydrochloride

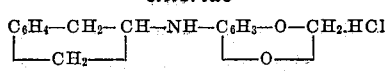

2-Piperonylidineamino-indane (Preparation 7) was reduced with hydrogen in an anhydrous ethanol solution as in the preceding example. From 5.3 grams (0.02 mole) of piperonylidineamino-indane there was obtained 5.9 grams of 96.7 per cent of the theoretical amount, of 2-piperonylamino-indane hydrochloride in the form of colorless flakes decomposing at 234° centigrade. Analysis of the product gave the following values.

|  | N | Cl |
|---|---|---|
| Cal. for $C_{17}H_{18}ClNO_2$ | 4.61 | 11.7 |
| Found | 4.74 | 11.8 |

Example 3.—2-p-Methoxy-benzylamino-indane hydrochloride

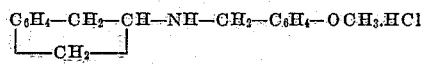

5 grams (0.02 mole) of 2-anisalamino-indane (Preparation 8) was dissolved in 50 milliliters of glacial acetic acid and reduced with hydrogen as in the preceding example. The hydrochloride of 2 - (p - methoxybenzylamino) - indane was obtained, after recrystallization from a mixture of methanol and acetone, in the form of colorless flakes which decomposed at 233° centigrade. The yield was 5.4 grams, or 93.1 per cent of the theoretical amount. Analysis of the product gave the following values:

|  | N | Cl |
|---|---|---|
| Cal. for $C_{17}H_{20}ClNO$ | 4.84 | 12.26 |
| Found | 5.07 | 12.31 |

Example 4.—2-Methylamino-indane hydrochloride

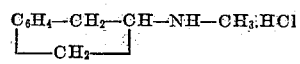

A mixture of 5.6 grams (0.02 mole) of 2-piperonylidine-amino-indane (Preparation 7), 2.9 milliliters (0.03 mole) of freshly distilled methyl sulfate, and 125 milliliters of anhydrous ethyl benzene was placed in a 500-milliliter round-bottomed flask and the air washed thoroughly from the flask with nitrogen. The stoppered flask was heated on the steam bath for 50 hours at the end of which time a dark oil had separated. The flask was cooled to room temperature, the contents diluted with 100 milliliters of aqueous methanol and the mixture refluxed for one-half hour. Five milliliters of concentrated hydrocloric acid was then added, the methanol removed by distillation, and the ethyl benzene removed in a current of steam. The aqueous solution remaining in the flask was extracted with ether and then made strongly alkaline with concentrated aqueous ammonia. The alkaline solution was again extracted with ether and the extract shaken with dilute aqueous hydrochloric acid. The acid aqueous layer was evaporated to dryness and the residue recrystallized from a mixture of anhydrous alcohol and ether with the addition of a little decolorizing charcoal. The product thus obtained consisted of 0.8 gram, or 21.6 per cent of the theoretical amount, of 2-methylamino-indane hydrochloride in the form of colorless crystals decomposing at 210° centigrade. The product had the following analysis:

|  | N | Cl |
|---|---|---|
| Calc. for $C_{10}H_{14}ClN$ | 7.63 | 19.35 |
| Found | 7.72 | 19.30 |

Example 5.—2-Benzyl-methylamino-indane

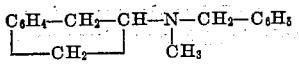

A mixture of 2.6 grams (0.01 mole) of 2-benzyl-amino-indane hydrochloride (Example 1), 1.3 grams (0.015 mole) of sodium bicarbonate, 6 milliliters of comercial formalin, and 10 milliliters of water was shaken and warmed until the initial reaction was completed. Ten milliliters of formic acid was then added and the mixture refluxed on the steam bath for 48 hours. The resulting tan-colored, clear solution was acidified with 5 milliliters of concentrated aqueous hydrochloride acid and evaporated on the steam bath to dryness. The crystalline product obtained was dissolved in water and decolorized with charcoal. The cooled and filtered solution was alkalized with aqueous sodium hydroxide and the colorless crystals which separated were filtered from the solution and then recrystallized from hot dilute ethanol. The recrystallized product melted at 56–57° centigrade. The yield was 2.0 grams or 90 per cent of the theoretical amount. The crystals had the following composition:

|  | N |
|---|---|
| Calc. for $C_{17}H_{19}N$ | 5.91 |
| Found | 5.90 |

Example 6.—2-Benzyl-methylamino-indane hydrochloride

This hydrochloride, prepared in the form of colorless crystals by dissolving the free amine of Example 5 in dilute aqueous hydrochloric acid, evaporating the solution to dryness and precipitating the residue from ethanol with ether, melted at 195° centigrade. Analysis of the 2-benzyl-methylamino-indane hydrochloride gave the following values:

|  | N | Cl |
|---|---|---|
| Calc. for $C_{17}H_{20}ClN$ | 5.12 | 12.98 |
| Found | 5.49 | 12.57 |

Other salts of 2-benzyl-methylamino-indane, such as the sulfate and hydrobromide, as well as salts of other N-substituted 2-amino-indanes, may be prepared readily by reacting the amine with the appropriate acid. Salts with organic acids may also be prepared if desired.

Numerous aldehydes, other than those mentioned, may be condensed with 2-amino-indane and the resulting azomethines utilized in ways analogous to those described in the preceding examples to form N-substituted 2-amino-indanes. Among the aldehydes which may be so employed may be mentioned acetaldehyde, butyraldehyde, propionaldehyde, alpha - phenyl - acetaldehyde, phenyl-acetaldehyde, cyclohexyl acetaldehyde, chlorobenzaldehyde, tolylaldehyde, xylylaldehyde, and many others.

We claim:

1. A compound of the group consisting of (a) N-substituted 2-amino-indanes having the formula

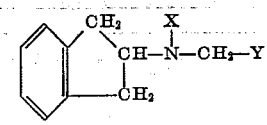

in which X is a member of the group consisting of hydrogen and the methyl radical and Y is a radical of the group consisting of alkyl, phenyl, alkoxylalkyl and alkoxyphenyl radicals, and (b) acid salts of the said amines.

2. The hydrochloride of 2-benzyl - methyl-amino-indane.
3. The hydrochloride of 2-benzylamino-indane.
4. 2-Piperonylamino-indane hydrochloride.
5. 2 - p - Methoxybenzylamino-indane hydrochloride.
6. 2-Methylamino-indane hydrochloride.

HAROLD G. KOLLOFF.
NATHAN LEVIN.

REFERENCES CITED

The following references are of record in the file of this patent:

Chem. Abstracts, vol. 11, p. 2676 (1917).
Chem. Abstracts, vol. 20, pp. 755, 756, and 2156 (1926).
Chem. Abstracts, vol. 25, pp. 2138–2139 (1931).
Suter et al, J. Am. Chem. Soc. 62 (1940). p. 3473.